United States Patent
Olney

(10) Patent No.: US 6,592,341 B1
(45) Date of Patent: Jul. 15, 2003

(54) SPA FILTER SYSTEM

(75) Inventor: Robert Kent Olney, Etiwanda, CA (US)

(73) Assignee: Jacuzzi, Inc., Walnut Creek, CA (US)

( * ) Notice: Subject to any disclaimer, the term of this patent is extended or adjusted under 35 U.S.C. 154(b) by 0 days.

(21) Appl. No.: 10/042,375

(22) Filed: Jan. 11, 2002

(51) Int. Cl.[7] ............... F04B 23/00; F04H 3/16; B01D 24/00
(52) U.S. Cl. .............. 417/313; 210/169; 210/416.2
(58) Field of Search .................. 417/313, 423.1, 417/355; 210/109, 194, 196, 416.1, 416.2, 433.1, 434

(56) References Cited

U.S. PATENT DOCUMENTS

| | | | |
|---|---|---|---|
| 4,419,775 A | * 12/1983 | Ebert | 4/541.4 |
| 4,533,476 A | * 8/1985 | Watkins | 210/805 |
| 4,552,658 A | * 11/1985 | Adcock et al. | 210/169 |
| 5,665,228 A | * 9/1997 | Leaverton et al. | 210/169 |
| 6,066,253 A | * 5/2000 | Idland et al. | 210/169 |
| 6,395,167 B1 | * 5/2002 | Mattson, Jr. et al. | 210/169 |
| 6,401,273 B1 | * 6/2002 | Fung et al. | 4/559 |

* cited by examiner

*Primary Examiner*—Charles G. Freay
*Assistant Examiner*—Michael K. Gray
(74) *Attorney, Agent, or Firm*—Thomas R. Lampe

(57) ABSTRACT

Apparatus for filtering spa water includes a therapy pump and a circulation pump. A filter of unitary construction includes a surface loading filter element for filtering water passing through the therapy pump and a depth loading filter element for filtering water passing through the circulation pump. A connector releasably interconnects the two filter elements.

27 Claims, 3 Drawing Sheets

SPA FILTER SYSTEM

TECHNICAL FIELD

This invention relates to filter apparatus utilized with a spa to filter the spa water.

BACKGROUND OF THE INVENTION

Spas typically incorporate both a circulation pump and a therapy pump. The circulation pump is conventionally a small capacity pump which provides continuous water circulation, while the therapy pump is relatively large and is utilized to pump relatively large quantities of water to provide therapeutic action.

It is known to incorporate separate filters for these pumps. These filters are both conventionally surface loading filters which must be separately cleaned and maintained on a periodic basis. This is a time consuming process. Furthermore, conventional surface loading filters, such as pleated filters are not particularly effective in removing oils, soaps or the like from the spa water. Several passes of the water through the filter is required to provide a reasonable degree of filtering of foreign substances.

DISCLOSURE OF INVENTION

The present invention relates to apparatus for filtering spa water which is characterized by its efficiency and effectiveness. The apparatus incorporates unique filter structure which facilitates spa maintenance. A depth loading filter element employed in the system achieves cleaner water than industry standard surface loading filter elements and improves spa water clarity by capturing on a single pass basis finer particulates and oils than is possible with conventional spa filters. The depth loading filter element is readily installed and removed and is a disposable item. With the arrangement of the present invention, single pass filtration speeds the water clarification process by at least half as compared to conventional spa filter systems.

The filter of the present invention is of unitary construction and includes a surface loading filter element having a surface loading filter element outlet and a depth loading filter element having a depth loading filter element outlet. The surface loading filter element outlet is for placement in fluid flow communication with the inlet of a spa therapy pump and the depth loading filter element is for placement in fluid flow communication with the inlet of a spa circulation pump.

A connector releasably connects the surface loading filter element and the depth loading filter element.

Other features, advantages and objects of the present invention will become apparent with reference to the following description and accompanying drawings.

BEST MODE FOR CARRYING OUT THE INVENTION

Figure 1:
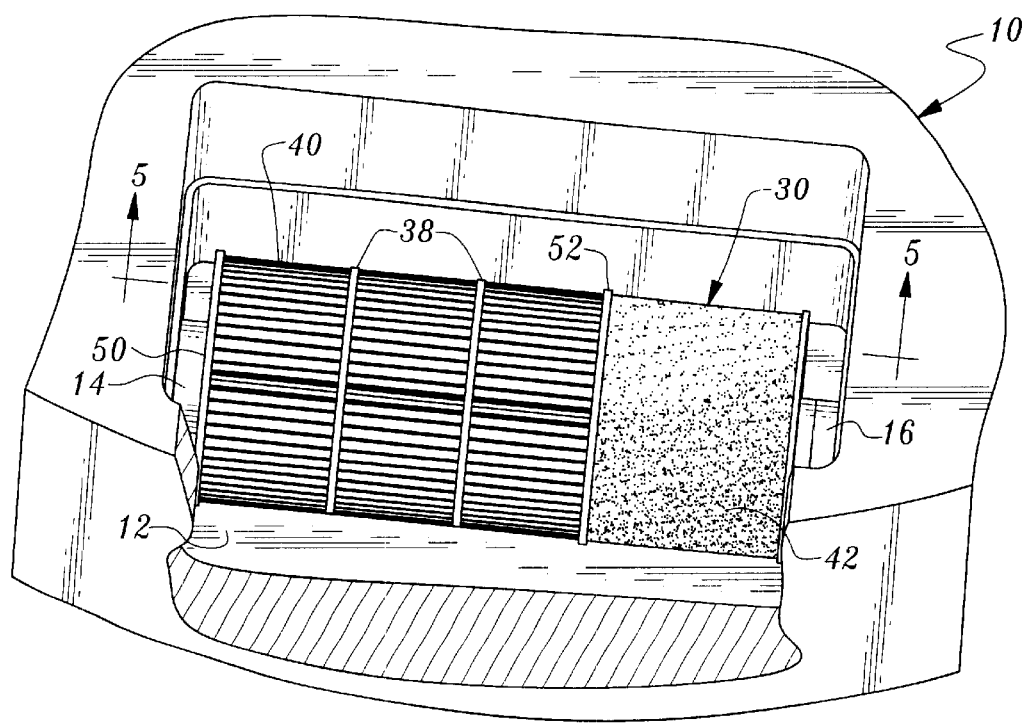
FIG. 1 is a front, elevation view illustrating a portion of a spa including a filter housing, the housing accommodating within the interior thereof a filter constructed in accordance with the teachings of the present invention.
Figure 2:
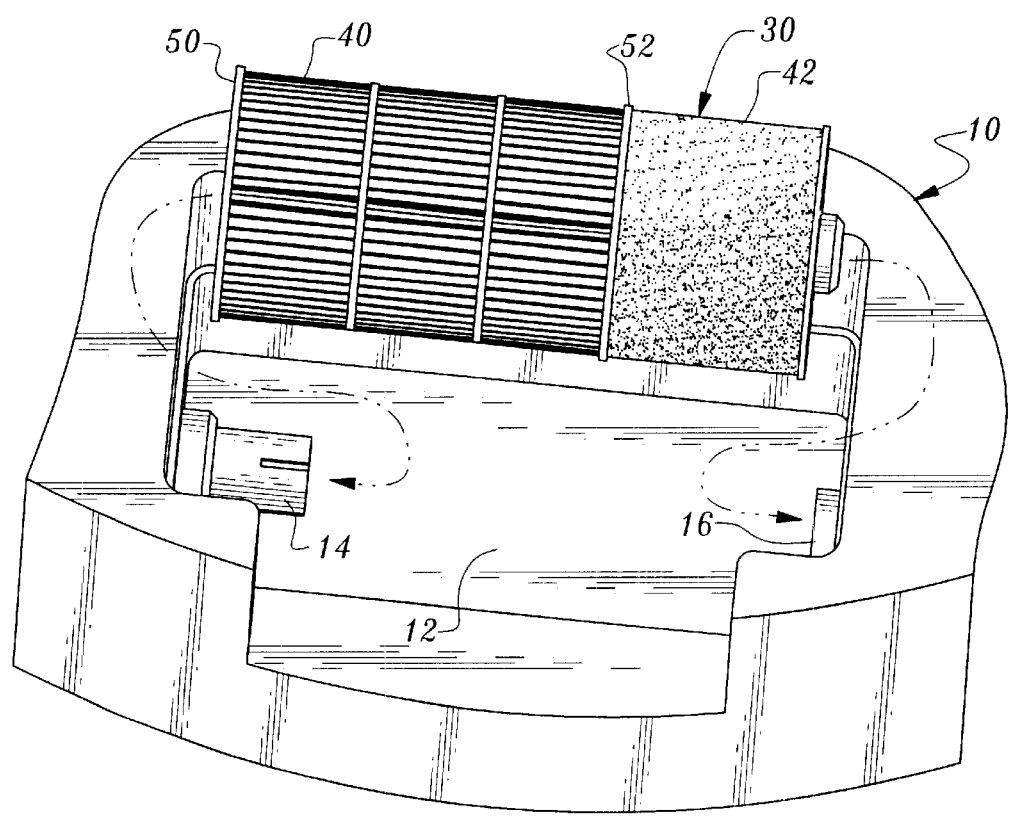
FIG. 2 is an elevational view illustrating the filter being installed in place in the filter housing.
Figure 3:
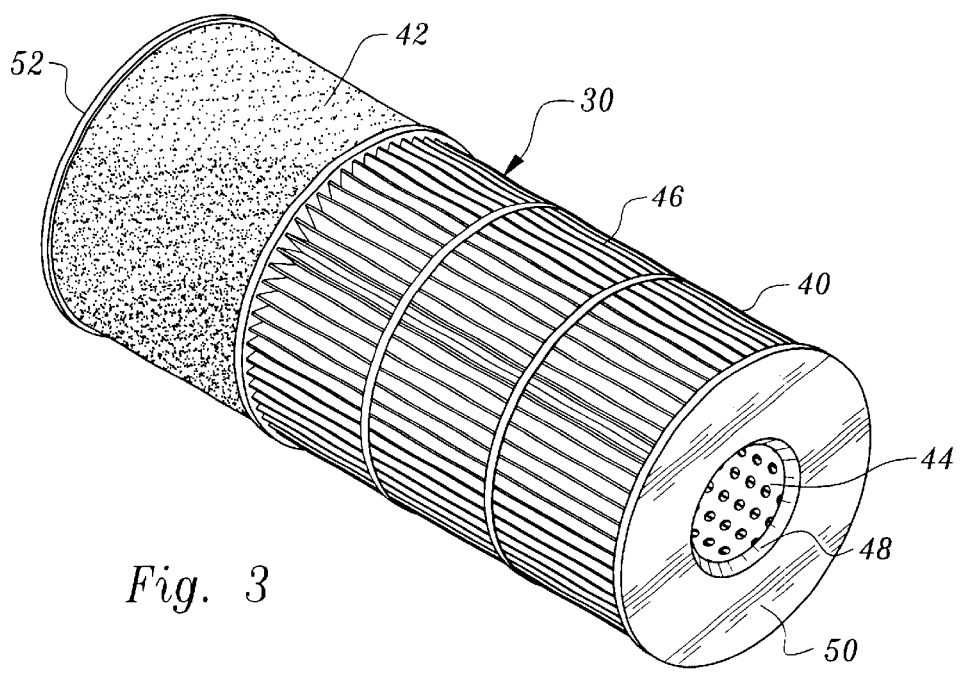
FIG. 3 is a perspective view of the filter, including a surface loading filter element and a depth loading filter element.
Figure 4:
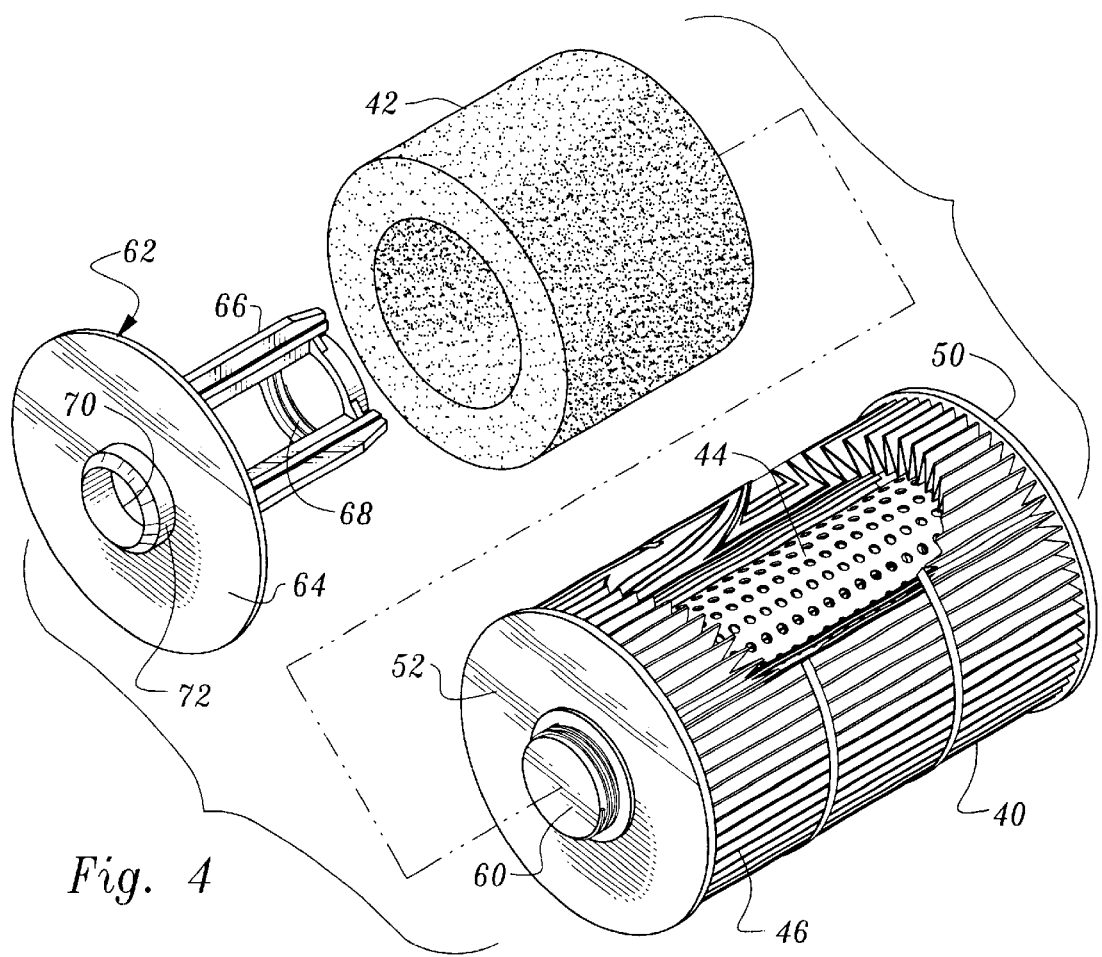
FIG. 4 is an exploded view of components of the filter, a portion of the surface loading filter element being broken away to show interior details thereof.

Referring now to the drawings, a spa 10 incorporates a filter housing 12 having an interior which receives spa water.

The housing has a housing outlet 14 and a housing outlet 16 spaced from, the housing outlets being spaced from one another.

Figure 8:
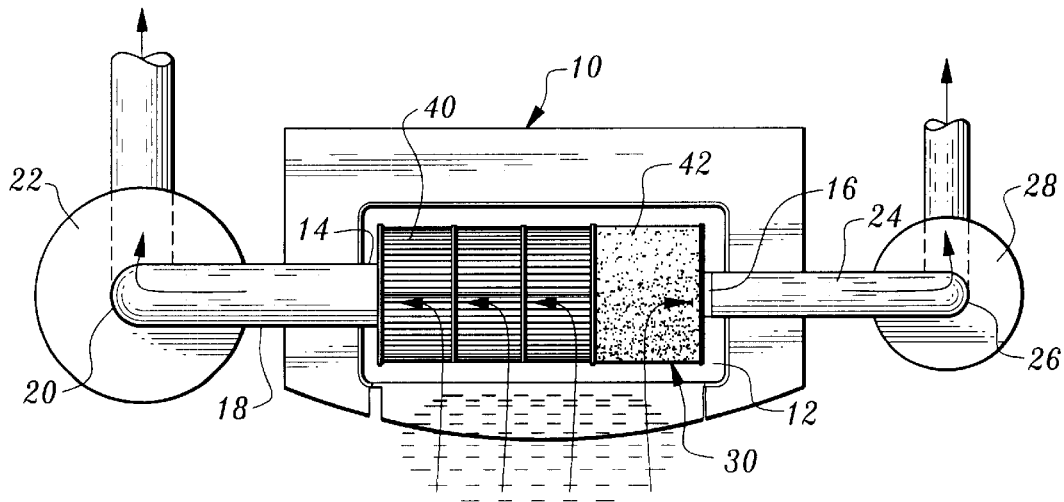
FIG. 8 is a schematic presentation of the filter in combination with a therapy pump and a circulation pump of the spa.

As can be seen with reference to FIG. 8, a conduit 18 leads from housing outlet 14 to the inlet 20 of a spa therapy pump 22. Conduit 24 leads from housing outlet 16 to the inlet 26 of a spa circulation pump 28. It is to be understood that the circulation pump has a smaller capacity than the therapy pump, as conventionally found in spas.

Filter housing 12 accommodates therein a filter 30 of specialized and unique construction. More particularly, the filter 30 is of unitary construction and includes a surface loading filter element 40 and a depth loading filter element 42.

The surface loading filter element is generally of known construction including a cylindrically shaped perforated internal, rigid member 44 and a pleated outer member 46 disposed about the internal member. Retainer bands 38 may be utilized to maintain the pleated outer member in place. The pleated outer member is formed of any suitable pleated sheet material which is relatively porous and provides for the relative free flow of spa water therethrough while filtering out to some degree larger particulate matter and other material on the outer surface thereof. The filtered spa water passes through outer member 46, internal member 44 and thence out of outlet 48 of the filter element 40. More particularly, the outlet 48 of the surface loading filter element receives housing outlet 14 which conveys the water filtered by filtering element 40 to the therapy pump via conduit 18. An end plate 50 of the filter element 40 defines the outlet 48 and another end plate, end plate 52, closes off the other end of the filter element 40. A threaded boss 60 projects outwardly from end plate 52.

A connector 62 cooperates with the threaded boss to releasably connect the surface loading filter element 40 and the depth loading filter element 42 to provide a filter of unitary construction. Connector 62 is in the nature of a hollow spindle, including a connector member 64 in the form of a circular plate and a projection 66 projecting from the connector member 64. The projection is an open framework which has an internally threaded circular end 68.

When installing the depth loading filter element 42 on the surface loading filter element 40, the projection is inserted through the depth loading filter element and circular end 68 is threadedly engaged with threaded boss 60. Connector member or plate 64 covers the outwardly disposed end of filter element 42. Connector member or plate 64 defines an aperture 70 and a hollow protrusion 72 beveled at the end thereof is positioned in housing outlet 16 when the filter 30 is installed in place in the filter housing 12, as shown for example in FIGS. 1 and 5.

The depth loading filter element 42 has a hollow cylindrical configuration and is preferably comprised of spun bound plastic fibers, even more preferably polypropylene fibers. The filter element 42 is suitable for use as a single pass disposable cartridge and is an ultra fine, low flow, depth-loading element having a flow capacity in the order of 15 gallons per minute or less. This filter element improves spa water clarity by capturing finer particulate materials and other materials such as oils than is the case with typical spa filters. Also, the depth loading filter element can readily be removed and replaced.

Figure 6:
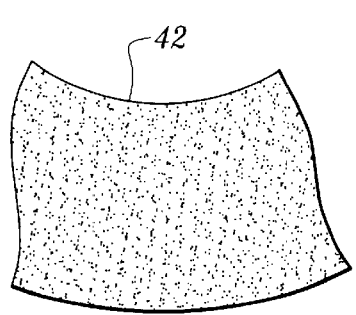
FIG. 6 is a greatly enlarged, cross-sectional view taken along the line 6—6 of FIG. 5, showing details of the depth loading filter element.
Figure 7:
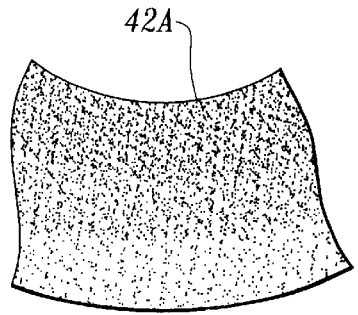
FIG. 7 is a view similar to FIG. 6, but illustrating an alternate embodiment of the depth loading filter element of variable density.

Spun bound polypropylene filter elements per se are known and are currently in use for removal of particulate materials from a variety of liquids, e.g., paint, water, oil, soap and resin. Such material has also been employed to filter air. In the spun bound technique the polypropylene fibers are applied randomly and bonded on a rotating core until the desired thickness is achieved. Filters of this general type are made available, for example, by Filter Specialist, Inc. of Michigan City, Ind. The depth loading filter element structure shown in FIG. 6 has a generally uniform density. FIG. 7, on the other hand, shows a depth loading filter element 42A increasing in density in the direction of the inner peripheral surface of the depth loading filter element.

In the assembled filter 30, the surface loading filter element and the depth loading filter element are coaxial and disposed end-to-end. The depth loading filter element has a hollow cylindrical configuration and includes an inner peripheral surface and an outer peripheral surface. The outer peripheral surfaces of the depth loading filter element and the surface loading filter element are of substantially the same diameter.

Figure 5:
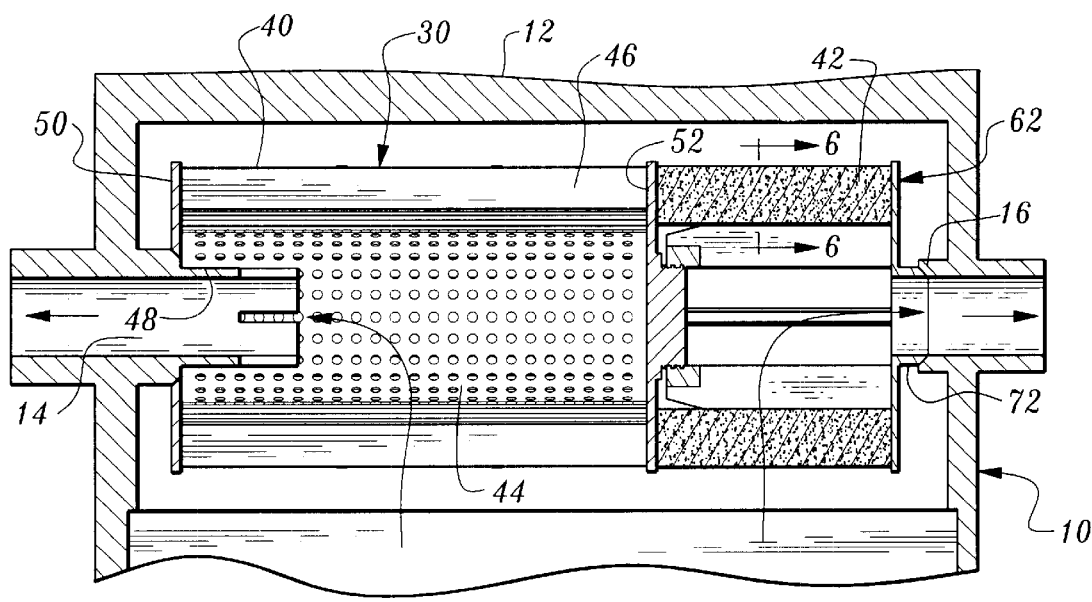
FIG. 5 is an enlarged, cross-sectional view taken along the line 5—5 in FIG. 1.

FIGS. 5 and 8 illustrate water flow through the filter and cooperable spa structure during operation of both the therapy pump 22 and the circulation pump 28. Such flows are completely independent as shown by the illustrated flow arrows. With respect to the depth loading filter element 42, flow through that filter element and thence through the passageway defined by the inner peripheral wall thereof. The filtered water passes through hollow protrusion 72 and through housing outlet 16. The flow through surface loading filter element 40 exits housing outlet 14 to the therapy pump 22.

It may thus be seen that in the arrangement of this invention two different filter elements are integrated into a single unitary filter. The double-ended filter construction allows two pumps to operate on a single filter simultaneously, thus saving the cost of a second independent filter and second filter housing. If desired, the connector 62 and other structure employed at the ends of one or both of the filter elements can be reused.

The invention claimed is:

1. Apparatus for filtering spa water, said apparatus comprising, in combination:
   a therapy pump having a therapy pump inlet;
   a circulation pump having a circulation pump inlet; and
   a filter of unitary construction including a surface loading filter element having a surface loading filter element outlet and a depth loading filter element having a depth loading filter element outlet, said surface loading filter element outlet being in fluid flow communication with said therapy pump inlet and said depth loading filter element being in fluid flow communication with said circulation pump.

2. The apparatus according to claim 1 additionally comprising a filter housing accommodating said filter, said filter housing having a first housing outlet and a second housing outlet, said first housing outlet being spaced from said second housing outlet, first conduit means leading from said first housing outlet providing fluid flow communication between said surface loading filter element outlet and said therapy pump and second conduit means leading from said second housing outlet providing fluid flow communication between said depth loading filter element outlet and said circulation pump.

3. The apparatus according to claim 1 wherein said surface loading filter element and said depth loading filter element are substantially coaxial and disposed end-to-end.

4. The apparatus according to claim 1 additionally comprising a connector connecting said surface loading filter element and said depth loading filter element.

5. The apparatus according to claim 1 wherein said depth loading filter element has a hollow cylindrical configuration and is comprised of spun bound plastic fibers.

6. The apparatus according to claim 5 wherein said depth loading filter element has an inner peripheral surface and an outer peripheral surface, said depth loading filter element increasing in density in the direction of said inner peripheral surface.

7. The apparatus according to claim 3 wherein said depth loading filter element has a hollow cylindrical configuration and wherein said surface loading filter element also has a hollow cylindrical configuration, the outer peripheral surfaces of said depth loading filter element and said surface loading filter element being of substantially the same diameter.

8. The apparatus according to claim 4 wherein said connector includes a connector member engaging an end of said depth loading filter element and a projection projecting from said connector member and extending through said depth loading filter element, said projection being releasably connected to said surface loading filter element.

9. The apparatus according to claim 8 wherein said surface loading filter element includes an end plate having a threaded boss thereon, said projection having threads thereon threadedly engaging said threaded boss.

10. The apparatus according to claim 8 wherein said depth loading filter element is hollow and defines a passageway accommodating said projection and wherein said connector member comprises a connector plate, said connector plate defining an aperture in fluid flow communication with said passageway.

11. The apparatus according to claim 10 wherein said connector member additionally includes a hollow protrusion extending from said connector plate about said aperture and extending away from said depth loading filter element, said apparatus also including a filter housing having an outlet leading from said depth loading filter element, said hollow protrusion located at said outlet.

12. Apparatus for filtering spa water, said apparatus comprising, in combination:
   a therapy pump having a therapy pump inlet;
   a circulation pump having a circulation pump inlet; and
   a filter of unitary construction including a first filter element having a first flow rate and a first filter element outlet and a second filter element having a second flow rate and a second filter element outlet, said first filter element outlet being in fluid flow communication with said therapy pump inlet for delivering spa water thereto and said second filter element being in fluid flow communication with said circulation pump inlet for delivering spa water thereto, said second flow rate being less than said first flow rate.

13. The apparatus according to claim 12 wherein said second flow rate is 15 gallons per minute or less.

14. A filter for filtering spa water, said filter being of unitary construction and including a surface loading filter element having a surface loading filter element outlet and a depth loading filter element having a depth loading filter element outlet, said surface loading filter element outlet for placement in fluid flow communication with the inlet of a spa therapy pump and said depth loading filter element for placement in fluid flow communication with the inlet of a spa circulation pump.

15. The filter according to claim 14 wherein said surface loading filter element and said depth loading filter element are substantially coaxial and disposed end-to-end.

16. The filter according to claim 14 additionally comprising a connector connecting said surface loading filter element and said depth loading filter element.

17. The filter according to claim 14 wherein said depth loading filter element has a hollow cylindrical configuration and is comprised of spun bound plastic fibers.

18. The filter according to claim 17 wherein said depth loading filter element has an inner peripheral surface and an outer peripheral surface, said depth loading filter element increasing in density in the direction of said inner peripheral surface.

19. The filter according to claim 15 wherein said depth loading filter element has a hollow cylindrical configuration and wherein said surface loading filter element also has a hollow cylindrical configuration, the outer peripheral surfaces of said depth loading filter element and said surface loading filter element being of substantially the same diameter.

20. The filter according to claim 16 wherein said connector includes a connector member engaging an end of said depth loading filter element and a projection projecting from said connector member and extending through said depth loading filter element, said projection being releasably connected to said surface loading filter element.

21. The filter according to claim 20 wherein said surface loading filter element includes an end plate having a threaded boss thereon, said projection having threads thereon threadedly engaging said threaded boss.

22. The filter according to claim 20 wherein said depth loading filter element is hollow and defines a passageway accommodating said projection and wherein said connector member comprises a connector plate, said connector plate defining an aperture in fluid flow communication with said passageway.

23. The filter according to claim 22 wherein said connector member additionally includes a hollow protrusion extending from said connector plate about said aperture and extending away from said depth loading filter element, said protrusion for location at a filter housing outlet leading to the inlet of the circulation pump.

24. A spa filter element for use with a spa to filter spa water, said filter element being a depth loading filter element for delivering filtered spa water to a spa pump, said filter element being comprised of spun bound plastic fibers.

25. The spa filter element according to claim 24 including a peripheral surface, said spun bound plastic fibers increasing in density in the direction of said peripheral surface.

26. The spa filter element according to claim 24 wherein said plastic fibers are polypropylene fibers, said spa filter element capable of absorbing 80% of its weight in oils.

27. The spa filter element according to claim 24 having a flow rate of 15 gallons per minute or less.

* * * * *